(12) United States Patent
Kondou

(10) Patent No.: US 6,773,645 B2
(45) Date of Patent: Aug. 10, 2004

(54) INJECTION MOLDING METHOD OF POLYAMIDE RESIN MOLDED ARTICLE

(75) Inventor: Kumeo Kondou, Toyoake (JP)

(73) Assignee: IOI Limited Company, Aichi-Pref. (JP)

(*) Notice: Subject to any disclaimer, the term of this patent is extended or adjusted under 35 U.S.C. 154(b) by 35 days.

(21) Appl. No.: 10/185,068

(22) Filed: Jul. 1, 2002

(65) Prior Publication Data

US 2003/0085489 A1 May 8, 2003

(30) Foreign Application Priority Data

Jul. 9, 2001 (JP) .......................................... 2001-207271
Jun. 3, 2002 (JP) .......................................... 2002-160899

(51) Int. Cl.[7] .......................... B29C 33/12; B29C 45/14; B29C 65/52
(52) U.S. Cl. ........................ 264/135; 264/259; 264/265; 264/271.1; 264/275
(58) Field of Search .................................. 264/134, 135, 264/254, 259, 265, 271.1, 274, 275, 250; 524/345, 346, 602, 604, 611, 713

(56) References Cited

U.S. PATENT DOCUMENTS

| | | | | |
|---|---|---|---|---|
| 4,182,382 A | * | 1/1980 | Ingraham | 140/3 R |
| 4,724,111 A | * | 2/1988 | Iwata et al. | 264/155 |
| 4,957,677 A | * | 9/1990 | Katoh et al. | 264/135 |
| 5,072,902 A | * | 12/1991 | Washizu et al. | 248/65 |
| 5,683,647 A | * | 11/1997 | Kawasaki et al. | 264/513 |
| 5,714,106 A | * | 2/1998 | Yoda et al. | 264/275 |
| 5,910,278 A | * | 6/1999 | Enomoto | 264/138 |

* cited by examiner

*Primary Examiner*—Angela Ortiz
(74) *Attorney, Agent, or Firm*—Wenderoth, Lind & Ponack, L.L.P.

(57) ABSTRACT

An injection molding method for a polyamide resin molded article in which an already-molded article including a polyamide resin is set in a molding die and, then, the polyamide resin, which has been heated so as to be in a molten state, is injection-filled in a cavity to which a part of the already-molded article faces thereby integrally molding an additional molding part onto the part of the already-molded article. A primer is applied to a predetermined integral molding part, and then the thus primer-applied already-molded article is set in the molding die. The primer includes an alcohol solution containing the polyamide resin and a chemical that is capable of dissolving the polyamide resin.

8 Claims, 8 Drawing Sheets

(A)

(B)

(A)

(B)

INJECTION MOLDING METHOD OF POLYAMIDE RESIN MOLDED ARTICLE

BACKGROUND OF THE INVENTION

1. Field of the Invention

The present invention relates to an injection molding method of a molded article of a polyamide resin represented by Nylon (under trade name).

2. Description of the Related Art

Ordinarily, a linear polymer having an amide bond as a repeating unit in a molecule is called a polyamide and, among other things, the polyamide mainly comprising an aliphatic chain is widely distributed as a resin under a trade name of 'Nylon' represented by Nylon 66, Nylon 6 and the like. Since a polyamide resin comprises an amide group having a large polarity, the polyamide resin has an excellent resistance to hydrocarbon type solvents such as gasoline, oil and the like. Further, since the polyamide resin has a relatively high heat resistance, it has been used as a favorable material for components of automotive vehicles, components of machinery and the like. Meanwhile, an integrally molding method that comprises the steps of continuously fabricating molded articles by an extrusion molding process and the like which has a high productivity to prepare an already-molded article, setting the thus-prepared already-molded article in a metallic mold and separately injection-molding only a complicated part which can not be molded by extrusion molding to the thus-set already-molded article is effective, since it can save cost and labor required for injection-molding a final molded article as an entire body.

However, even when, for aiming at performing molding by using the polyamide resin by means of the above-described method, a molten polyamide resin is injection-filled against a predetermined integral molding part of the already-molded article comprising the polyamide resin which has already been molded by using extrusion molding or the like, the molten polyamide resin and the already-molded article are not integrally bonded to each other such that they separate from each other as they are cooled. It has ordinarily been known that, even when a molten resin, of a crystalline polymer such as the polyamide resin, which has a same composition as that of the already-molded article is filled against the already-molded article in a metallic die for injection molding, there occurs no integral bonding therebetween. The reason is surmised as described below. It is required for heating the metallic die to hold a predetermined temperature when the already-molded article is set in the metallic die and, then, the molten resin is filled for an addition molding part. On this occasion, since crystallization of the already-molded article in the metallic die is promoted, bonding strength thereof against an amorphous molten resin to be used for the additional molding part is decreased. This is because it is considered that, when the crystalline polymer is heated, partial melting occurs therein at a considerably lower temperature than a melting point thereof and, subsequently, recrystallization occurs therein. Therefore, the already-molded part and the molten resin part become each individually crystallized where upon they are not bonded to each other. Since a crystal structure of the polyamide resin is firm with an involvement of a hydrogen bond between amide bonds, it has been difficult to perform integration.

It has been known that, in the case described above, particularly in a case of a polyethylene resin molded article or the like which is a crystalline polymer similar to the polyamide resin, when, after an acetone type primer is applied to a predetermined integral molding part of the already-molded article, the above-described injection-addition molding operation is performed, the already-molded article and the resultant molded part are bonded to each other. The primer on this occasion denotes an organic solvent to be applied in advance as a pretreatment agent to the predetermined bonding part of the already-molded article and, for this application, the primer mainly comprising acetone has conventionally been distributed in the market. However, when, in the case of the polyamide resin, the present inventor performed such a molding operation by applying the acetone type primer to the polyamide resin, a molded article having a sufficient boding strength was unable to be obtained.

Further, as an integral injection molding method of a polyamide resin molded article having a sufficient bonding strength at a bonded part between the already-molded article and the additional molding part, a resistance welding method has been known. It is a method in which an electrically conductive wire is incorporated into the already-molded article along a periphery of the predetermined integral molding part of the already-molded article and, then, heated by an introduction of electric current to a hot wire whereby the above-described predetermined integral molding part is allowed to be slightly melted to be in an amorphous state and, then, the polyamide molten resin for the additional parts injection-filled in the metallic die such that the polyamide molten resin covers the predetermined integral molding part to perform molding. In a case of this method, there are mentioned problems described below. (1) Working efficiency in performing incorporation of the electrically conductive wire is extremely low whereupon, particularly, incorporation work against a small-sized molded article becomes difficult. (2) Since it takes time to melt the already-molded article comprising the polyamide resin by the hot wire, production efficiency at the time of injection molding is low. (3) Since the electrically conductive wire remains in the polyamide resin after the injection molding has been executed, when the resin molded article is recovered for the purpose of reuse after a product comprising such a resin molded article has been used, it is impossible to reuse the part thereof incorporated with the electrically conductive wire. (4) Since a part of the molten resin corresponding to a volume of the electrically conductive wire is squeezed out to be a burr when the molded article is released from the metallic die whereupon there is a need for a finishing treatment.

OBJECTS OF THE INVENTION

An object, therefore, of the present invention is to provide a method in which, when an additional molding part comprising a same resin as that of an already-molded article which comprises a polyamide resin is injection-molded against the already-molded article, they are integrated while securing a sufficient bonding strength therebetween only by an application of a primer.

SUMMARY OF THE INVENTION

A first aspect of the present invention is a method in which an already-molded article comprising a polyamide resin is set in a molding die and, then, the polyamide resin that has been heated to be in a molten state is injection-filled in a cavity to which a part of the already-molded article faces thereby integrally molding an additional molding part onto the part of the already-molded article, characterized in that a primer comprising an alcohol solution containing the polyamide resin and a chemical that is capable of dissolving the polyamide resin is applied to a predetermined integral molding part of the already-molded article with the additional molding part and, then, the thus primer-applied already-molded article is set in a molding die.

According to the first aspect of the present invention, at the time of molding the polyamide resin, when a molded article having an intended shape is molded by firstly molding in advance a part having a shape suitable for continuous molding such as extrusion molding, blow molding or the like to prepare an already-molded article and, then, injection-molding a only part having a complicated shape which is incapable of being continuously molded in an additional manner against the thus-prepared already-molded article thereby integrally bonding them, it is possible to integrate an additional molding part while having a sufficient bonding strength by injection molding only by adding such a simple operation as to apply the above-described primer to the predetermined integral molding part of the above-described already-molded article. Therefore, a complicated operation, such as incorporating an electrically conductive wire into the predetermined integral molding part is not necessary. Further, ordinarily, when the additional molding part, is injection-molded against the already-molded article, it is necessary to control a temperature of the molding die such that it is allowed to be higher than an ordinary molding temperature; however, when an integration is performed with an application of the primer, the integration can be performed without depending on the temperature of the molding die. Furthermore, there is no fear of generating a burr whereby productivity of the additional injection molding operation can be enhanced. Still furthermore, when the integrally molded article is melted, an original resin can be recovered without generating wastes whereupon the integrally molded article is suitable for reuse.

The injection molding method of the polyamide resin molded article according to the present invention is characterized in that an alcoholic primer which is different from the conventional acetone type primer containing acetone as a main component is applied. (hereinafter, the primer according to the present invention is referred to as alcoholic primer). The term "alcoholic primer" used herein is intended to include an alcohol solution of the polyamide resin containing a chemical which dissolves the polyamide resin. As an optimum chemical which dissolves the polyamide resin according to the present invention, mentioned are phenols such as phenol, 1,3-dihydroxybenzene and the like. Further, as solvents, which are capable of being easily evaporated after being applied, for use in the polyamide resin and the chemical which dissolves the polyamide resin, mentioned are alcohols each of which has carbon atoms of from 1 to 6 and has a hydrogen bond in a same manner as in the polyamide resin; on this occasion, the alcohols may be a mixture of different types of alcohols. The polyamide resin may be of any type so long as it is the same as in cases of the already-molded article and the additional molding part.

It is well known in the art that the polyamide resin is a crystalline polymer in which a hydrogen bond can be formed between amide bonds of different polymer chains and, since an intermolecular force acts strongly in a crystalline region thereof, the polyamide resin is not readily dissolved and, therefore, only a minute change is noticed therein against acetone. On the other hand, by applying the alcoholic primer to the predetermined integral molding part of the already-molded article, due to an action of the chemical which dissolves the polyamide resin contained in the alcohol solution, the polyamide resin of the predetermined integral molding part is partially dissolved so as to be in an amorphous state which allows a space between the polymer chains thereof to be enlarged. Then, the polyamide resin contained in the alcoholic primer is intertwined with such polymer chains of the polyamide resin in a disorderly manner to be like a wedge. Although it is considered that the alcoholic solvent is evaporated after being applied, such a wedge made of the polymer chains of the polyamide resin in the alcoholic primer and the chemical which dissolves the polyamide resin are left on a surface of the predetermined integral molding part to maintain an amorphous state. When a molten resin for the additional molding part is injection-filled against the predetermined integral molding part, both polyamide resins which are each in an amorphous state are intertwined with each other in a disorderly manner by being subjected to heat of the molten resin. Namely, when cooled in the molding die, the predetermined integral molding part and the additional molding part are prevented from being each individually recrystallized by the act of the stereo-configuration type wedge of the polymer chains of the polyamide resin contained in the alcoholic primer whereupon the already-molded article and the additional molding part can be integrated while having a sufficient bonding strength therebetween.

A second aspect of the present invention is characterized in that the primer according to the first aspect of the present invention is a solution comprising 1,3-dihydroxybenzene of from 20% by weight to 25% by weight, a polyamide resin of from 10% by weight to 20% by weight and methanol of from 60% by weight to 70% by weight.

When 1,3-dihydroxybenzene which acts to enlarge an intermolecular space of the polyamide resin is over a range of from 20% by weight to 25% by weight, since melting of the predetermined integral molding part of the already-molded article excessively advances whereupon it inappropriately becomes difficult to retain an original shape, while when 1,3-dihydroxybenzene is below the above-described range, a region of an amorphous state is not sufficiently spread therein whereupon a sufficient strength for integration cannot be held. Further, when the polyamide resin is over the range of from 10% by weight to 20% by weight, a viscosity of the alcoholic primer becomes high whereupon a handling property thereof is deteriorated, while, when it is below the above-described range, it becomes difficult to allow the polyamide resin to function as a wedge whereupon a sufficient strength for integration can not be held. Methanol, being small in molecule, is a solvent which can easily approach various types of larger molecules and also a solvent which, among alcohols, exhibits a strong hydrogen bond property to dissolve 1,3-dihydroxybenzene. When the primer solution contains methanol of from 60% by weight to 70% by weight, the handling property thereof is favorably held.

A third aspect of the present invention is characterized in that the polyamide resin according to the first or second aspect of the present invention is an aliphatic nylon resin.

Examples of aliphatic nylon resins include nylon 6, nylon 66, nylon 11, nylon 12, nylon 610, nylon 612, nylon 69 and the like and, further, include mixtures of two types or more of the aliphatic nylon resins or copolymers thereof such as nylon 6/nylon 66, nylon 6/nylon 11, nylon 66/nylon 610 and the like and, still further, include polymer alloys of the above-described aliphatic nylon resins blended with polyolefin type rubber and the like. According to the third aspect of the present invention, since there is a degree of freedom to some extent in the stereo-configuration of a side-chain methylene group of an amide group of the aliphatic nylon resin contrary to an aliphatic or aromatic ring having a ring structure which is rigid and symmetric, there is a degree of freedom to a great extent in phase transfer from a crystalline state to an amorphous state or vise versa; on this occasion, it is considered that the polyamide resin contained in the alcoholic primer is easy to function as the wedge whereupon a sufficient strength of integration can be obtained.

A fourth aspect of the present invention is characterized in that the already-molded article according to any one of the first to third aspects of the present invention is a molded article in a shape of an elongated pipe while the additional molding part according to any one of the first to third aspects of the present invention is addition-molded such that it covers an end part, in a longitudinal direction, of the already-molded article.

A resin molded article in a shape of the elongated pipe requires, regardless of a simple shape thereof, a large-sized molding die thereby allowing a blanking operation of an inside peripheral part to be difficult to be performed whereupon the shape is inappropriate for injection molding but is appropriate for continuous molding such as extrusion molding, blow molding and the like. According to the fourth aspect of the present invention, since it is possible to hold one end part of the resin molded article in a shape of the elongated pipe and, further, by performing injection molding by using the molding die having a cavity in which the additional molding part is molded, the resin molded article in a shape of the elongated pipe which is the already-molded article and the additional molding part which is molded onto an end part, in the longitudinal direction, of the resin molded article can be integrated therebetween whereupon molding can effectively be conducted without using a large-sized molding die.

EXAMPLES

Figure 1:
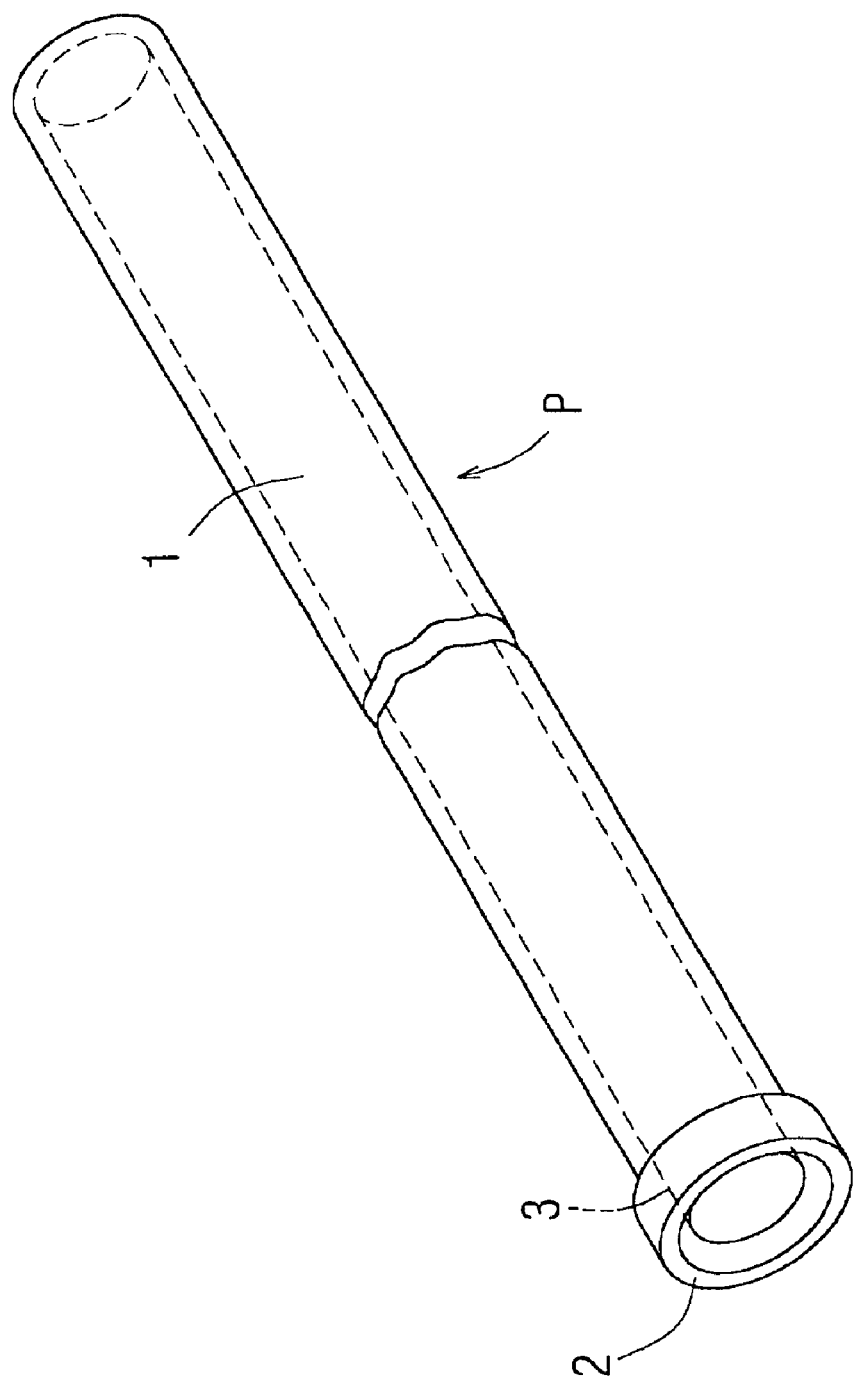
FIG. 1 is a perspective view of a protective pipe P which is a polyamide resin molded article according to the present invention.
Figure 2:
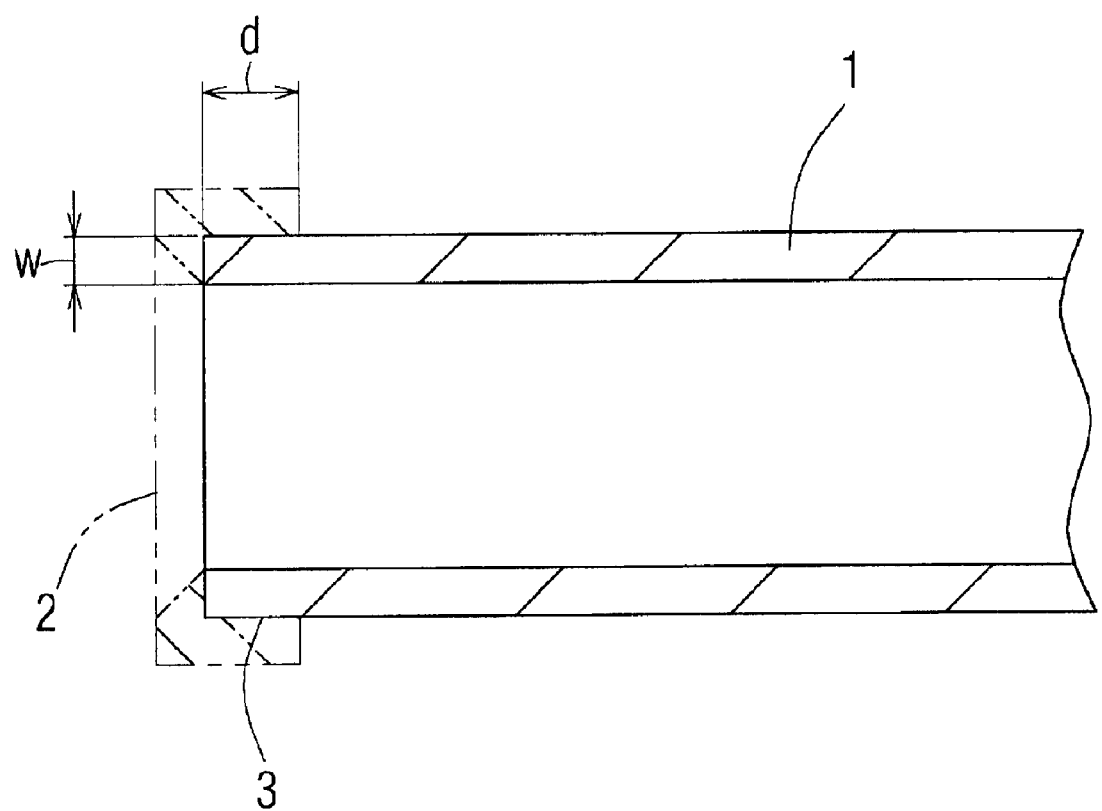
FIG. 2 is a diagram showing a predetermined integral molding part 3 of one end of a casing pipe 1.

Hereinafter, as an embodiment according to the present invention, a molding method of a protective pipe P, being a type of an automotive component, which is a polyamide resin molded article for preventing deformation and the like of a wire by allowing the wire to be inserted therein will be described. As shown in FIGS. 1 and 2, the protective pipe P is integrally molded by the steps of firstly applying an alcoholic primer on a predetermined integral molding part 3 of one end of a casing pipe 1 in a shape of an elongated pipe and then injection-molding a tip cap portion 2 onto the predetermined integral molding part 3. Namely, the casing pipe 1 is an article which is prepared by cutting a molded article which has continuously been molded by extrusion molding while the protective pipe P is an article which is prepared by integrally molding the tip cap portion 2 onto one end of the thus-prepared casing pipe 1 which is, in other words, an already-molded article. On this occasion, the polyamide resin for use in both molding the casing pipe 1 and the tip cap portion 2 is nylon 6.

Figure 3:
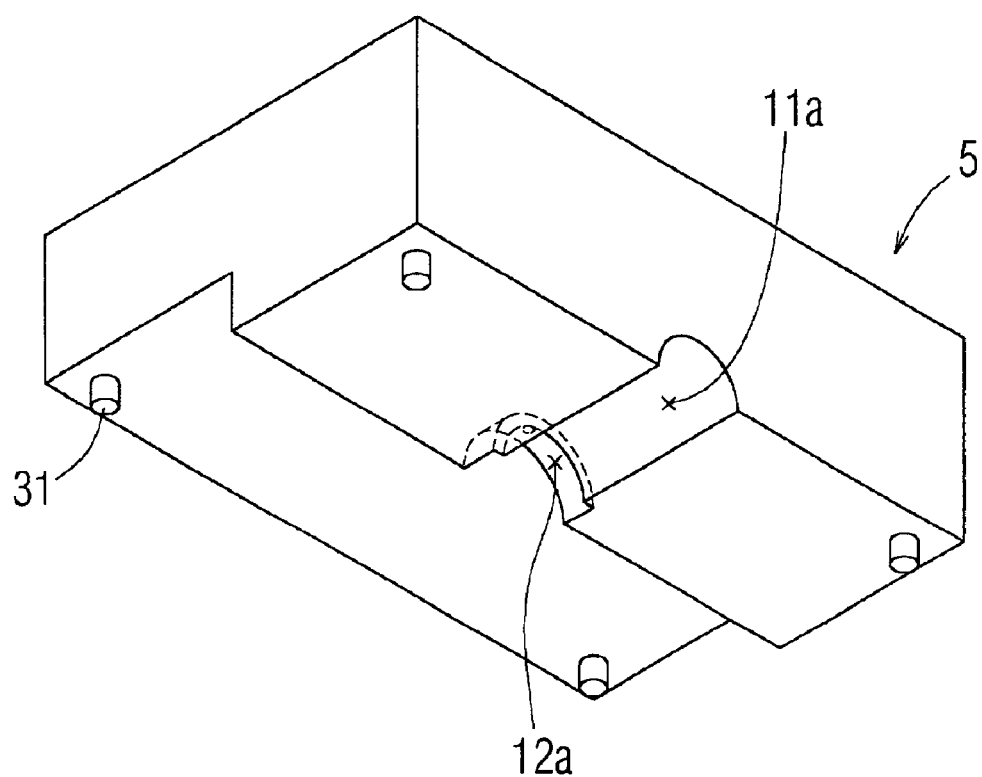
FIG. 3 is a perspective view of a metallic die M in a state in which an upper mold 5 is separated from an insert mold 6 and a lower mold 7.
Figure 3:
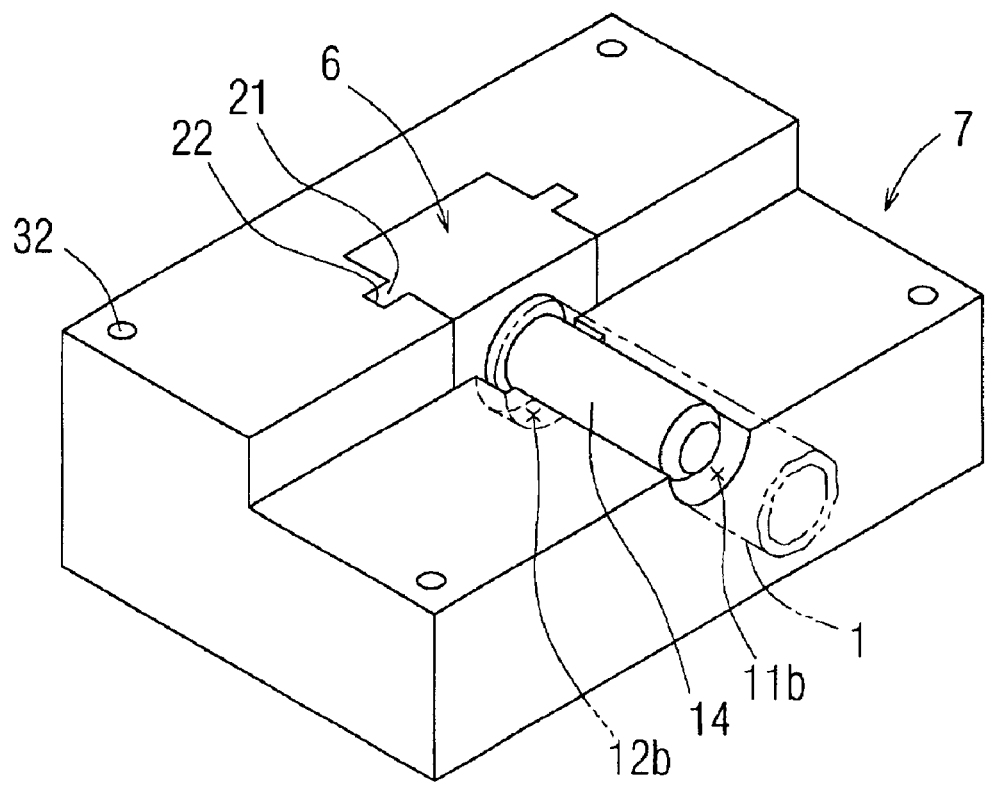
Figure 4:
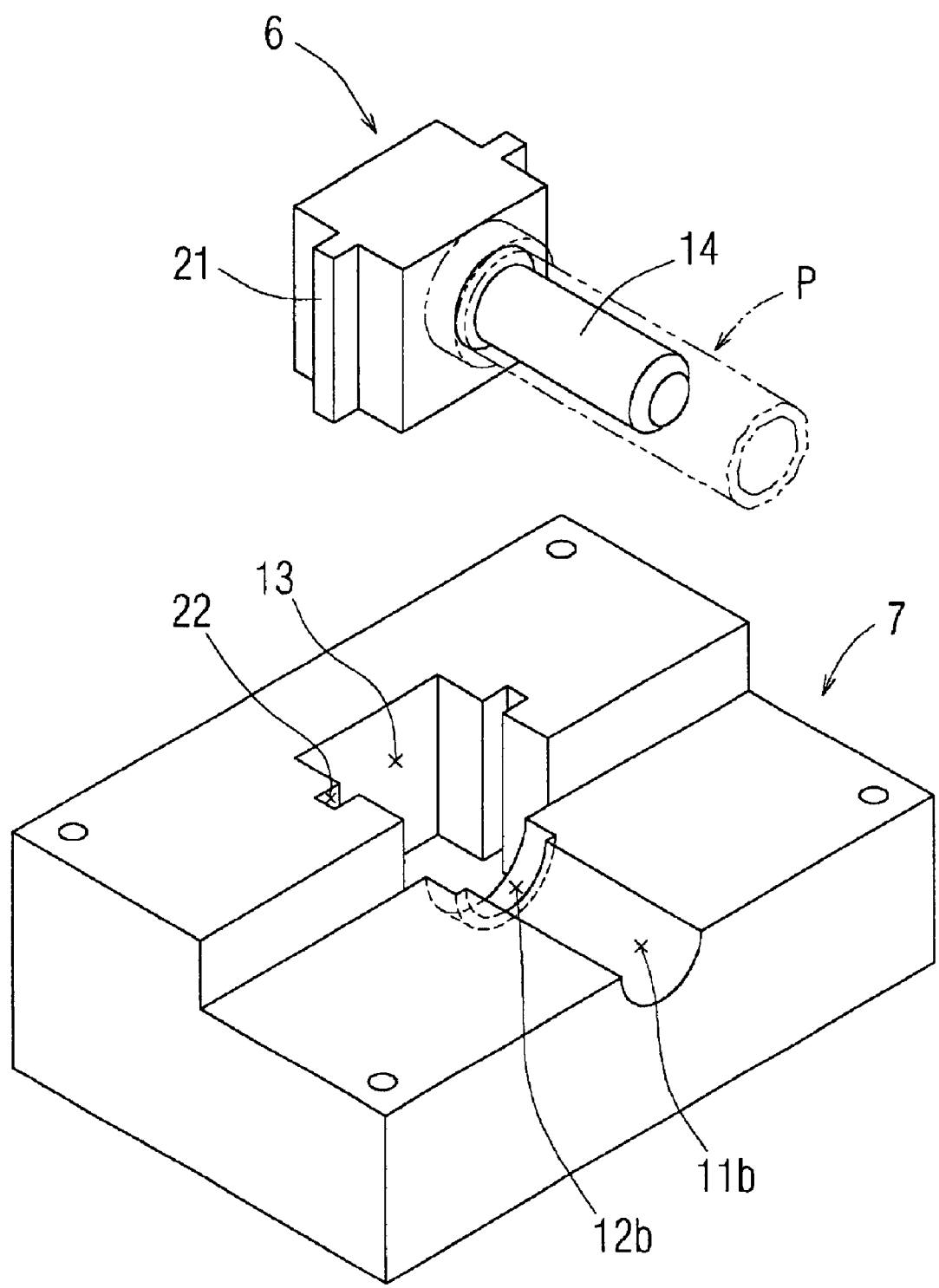
FIG. 4 is a perspective view of a metallic die M in a state in which an insert mold 6 is separated from a lower mold 7.
Figure 5:
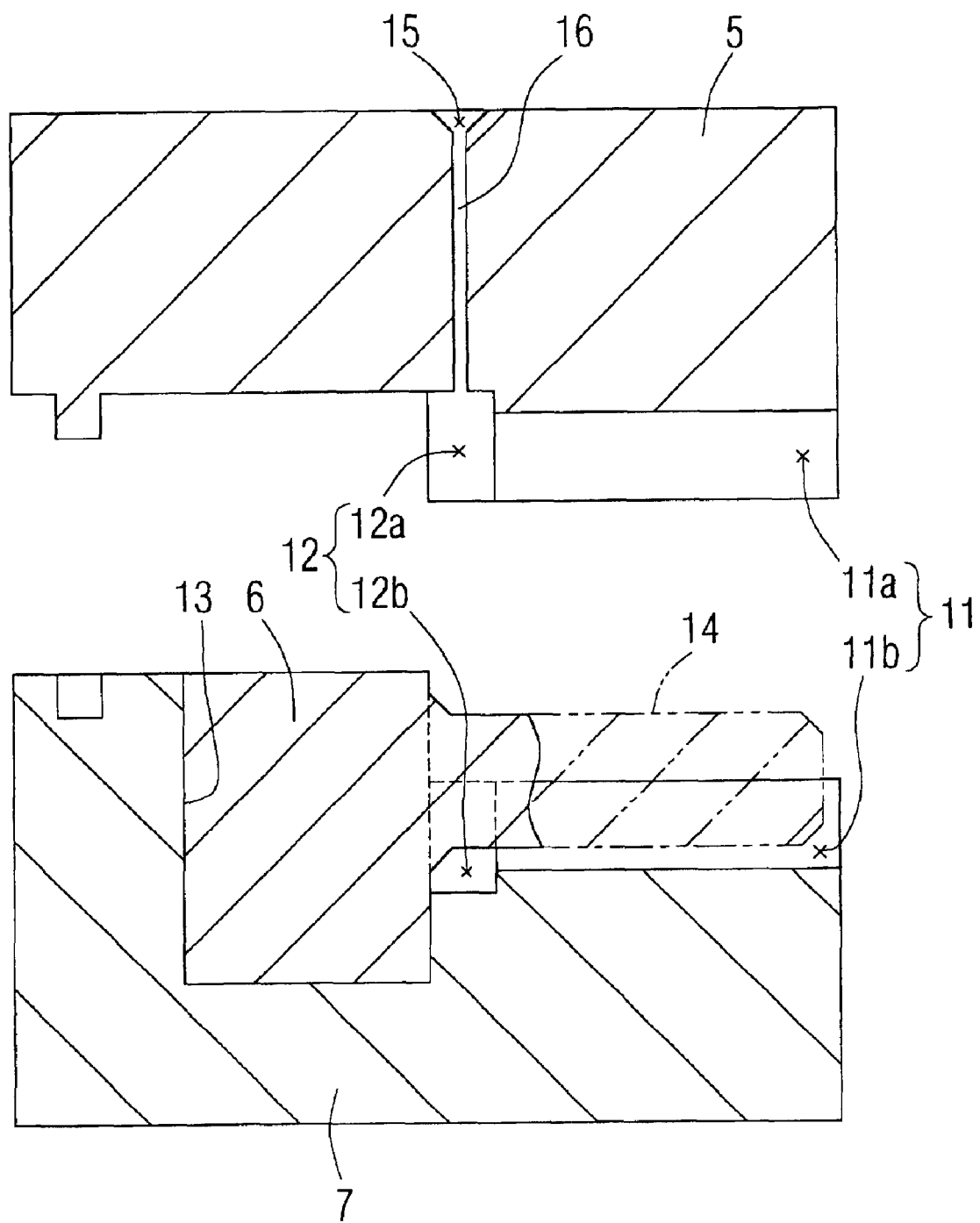
FIG. 5 is a cross-sectional view of a metallic die M in a separated state.

The tip cap portion 2 is injection-molded by using a metallic die M comprising an upper mold 5, an insert mold 6 and a lower mold 7. The upper mold 5 and the lower mold 7 each individually have a step part. The step part, and a protrusion and a recess of respective step parts face with each other in a vertical direction to allow contact surfaces to be adhered to each other thereby making up an integrated metallic die. The insert mold 6 is a mold which is used by being fitted in an insert mold fitting groove part 13 of the lower mold 7. A rod-like part 14 protrudes from an exposed side surface of the insert mold. The rod-like part has a columnar shape for being inserted along an inner peripheral part of the casing pipe 1, and a proximal end part of the rod-like part 14 for the pipe corresponds to a shape of an inner peripheral part of the tip cap portion 2 having a C-shaped chamfer. In the upper mold 5 and the lower mold 7, an upper groove part 11a and a lower groove part 11b, which correspond to an outer peripheral shape of the casing pipe 1, and an upper mold cavity part 12a and a lower mold cavity part 12b for molding the tip cap portion 2 are provided in an opposing manner relative to each other such that there parts are allowed to have a shape of a tip part of the protective pipe P in a continuous manner when they are combined. The insert mold 6 is arranged in an attachable/detachable manner relative to the lower mold 7 whereby, as shown in FIG. 4, the protective pipe P which is a molded article can be removed from the insert mold 6 in a state in which the insert mold 6 is removed from the lower mold 7. Further, reference numerals 21 and 22 in each of FIGS. 3 and 4 denote a fitting linear projection and a fitting groove provided in the insert mold 6 and the lower mold 7, respectively, while reference numerals 31 and 32 in FIG. 3 denote a fitting projection and a fitting hole to allow the upper mold 5 and the lower mold 7 to be in registry with each other.

As shown in FIG. 2, in the casing pipe 1 which has been molded in advance by extrusion molding, an alcoholic primer is applied to the predetermined integral molding part 3 thereof which comprises an end part thereof along a longitudinal direction having a size of $\underline{d}$ along an axis on which bonding with a tip cap portion 2 is predetermined to be performed and an end surface part thereof having a thickness of $\underline{w}$. The alcoholic primer, being a methanol solution containing 25% by weight of 1,3-dihydroxybenzene and 20% by weight of a nylon 66 resin, is excellent in a working property for application. Further, the primer may be left to stand as it is after being applied. When the alcoholic primer is applied to the predetermined integral molding part 3 of the already-molded article, a solid layer adjacent to a primer solution layer which is the thus primer-applied part is dissolved by an action of 1,3-dihydroxybenzene. Namely, polymer chains of a nylon 6 resin which are present in a crystalline region in the predetermined integral molding part 3 before the alcoholic primer is applied are allowed to be in an amorphous region due to the fact that a hydrogen bond between amide bonds of respective polymer chains of the nylon 6 resin is cancelled by 1,3-dihydroxybenzene after the alcoholic primer is applied whereupon a space between the polymer chains of the nylon 6 resin is enlarged.

Figure 6:
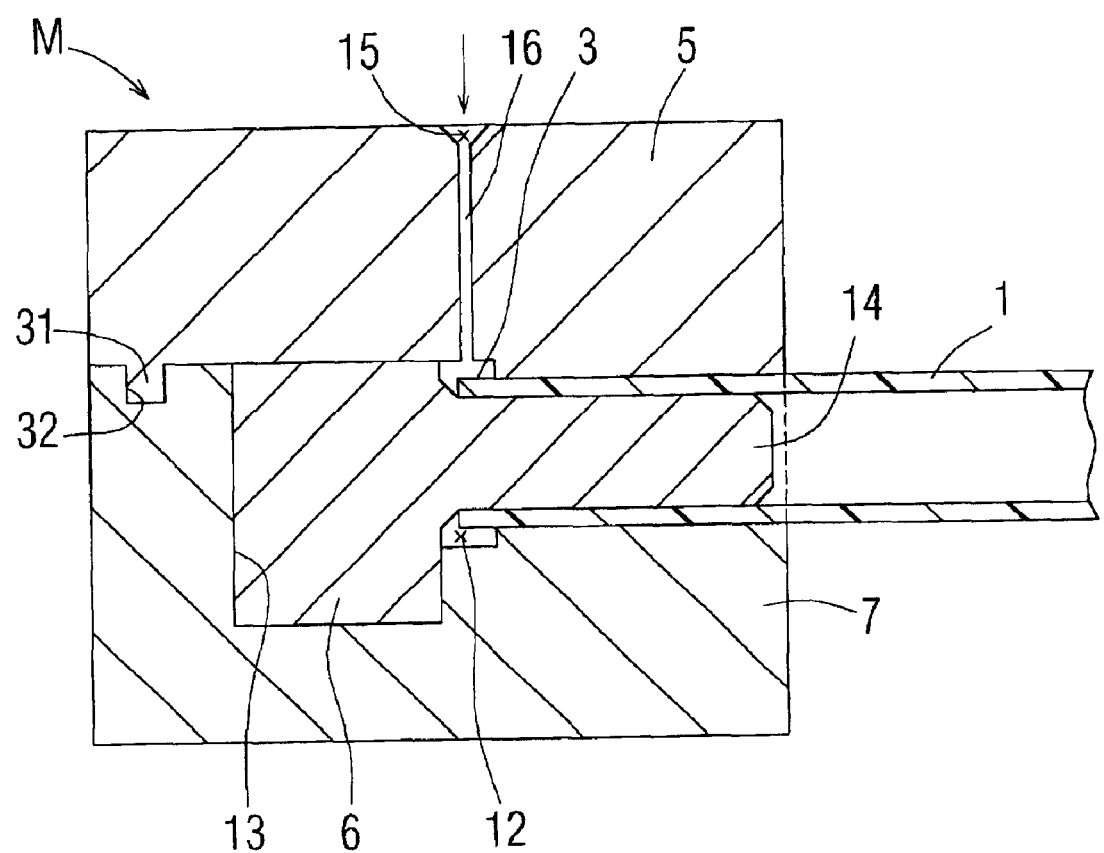
FIG. 6 is a cross-sectional view of a metallic die M in a molding state.

Further, a nylon 66 resin which is a polyamide resin is contained in the alcoholic primer in an amorphous state by being dissolved whereupon such a nylon 66 resin is intertwined in a disorderly manner with the nylon 6 resin in which a space between polymer chains of the predetermined integral molding part 3 shown in FIGS. 2 and 6 is enlarged. In other words, the space between molecules of the nylon 6 resin is locked by a molecule of the nylon 66 resin so as to prevent the nylon 6 from being recrystallized in a stereo configuration manner such that a crystal structure of the predetermined integral molding part 3 before the application of the primer, in which an intermolecular force by the hydrogen bond acts, can not be restored.

Then, when, after the rod-like part 14 for a pipe of the insert mold 6 is inserted in an inner periphery of the casing pipe 1, the insert mold 6 is incorporated in the insert mold incorporating groove part 13, the casing pipe 1 is disposed in a groove part 11b for a pipe of the lower mold 7. It is not necessary to particularly hold the metallic die M at a high temperature but is permissible to hold it at an ordinary heating temperature. After the lower mold 7 is allowed to be in registry with the upper mold 5, a nylon 6 molten resin for the tip cap portion 2 which has been heat-melted to be in an amorphous state is injection-filled in a cavity 12 comprising individually separated cavities 12a and 12b from a gate 15 and a sprue 16. Then, in an interface between the nylon 6 molten resin and the predetermined integral molding part 3 on which the alcoholic primer has been applied, polymer chains of the nylon 6 resin which has each been allowed to be in an amorphous state are in a state in which they are intertwined with each other in a disorderly manner by the action of the nylon 66 resin, which is also allowed to be in an amorphous state, contained in the alcoholic primer as a wedge.

After filling of the molten metal is terminated, the nylon 6 resin molded article comprising an integrated part between the nylon 6 molten resin of the tip cap portion 2 and the predetermined integral molding part 3 of the casing pipe 1 is cooled in the metallic die. The amorphous region in which the predetermined molding part 3 of the casing pipe 1 and the tip cap portion 2 are intertwined with each other in a disorderly manner is solidified to be crystallized as a temperature is decreased. Namely, integration becomes possible. When the molded article is released from the metallic die, no burr or the like is generated in a periphery of the predetermined integral molding part 3 thereof, being different from the resistance welding method which is a conventional molding method. Accordingly, an additional molding part can be bonded by injection molding in a separate process while holding a bonding strength and a high precision. Since the casing pipe 1 has an inner diameter of 6 mm, an outer diameter of 8 mm and a total length of 680 mm, it is difficult to injection-mold it whereupon it becomes possible to perform molding particularly efficiently by integrating the bonding part by the injection molding in a separate process.

After the protective pipe P was molded by the above-described method, a tensile test was performed for confirming strength of the bonding part between the casing pipe 1 and the tip cap portion 2. The polyamide resins used for molding were all the nylon 6 resin; on this occasion, the casing pipe 1 was molded using NOVAMID 1030 and NOVAMID ST145 (both being available from Mitsubishi Engineering-Plastics Corporation) in a mixing ratio to be described below. NOVAMID ST145 is a polymer alloy of a polyamide resin containing a polyolefin. The tip cap portion 2 was molded by using NOVAMID 1013G30-1 (available from Mitsubishi Engineering-Plastics Corporation). As a tensile tester, STROGRAPH V10-C (available from Toyo Seiki Co., Ltd.) was used whereupon, while holding an end part of the casing pipe 1 and the tip cap portion 2 at another end part which constitute the protective pipe P, tensile strength at the time of occurrence of abnormality was measured at a normal temperature and at an elastic stress rate of 50.0 mm/min. The inner and outer diameters of the casing pipe 1 were 6 mm and 8 mm, respectively. Further, an outer diameter of the tip cap portion 2 was 10 mm and length thereof in an axial direction was 3mm. Results of the tensile test in Examples 1 and 2 and Comparative Examples 1 and 2 which are described below are shown in Table 1.

Example 1

Polyamide resins having a mixing ratio of; NOVAMID 1030:NOVAMID ST145=1:1 were used for a casing pipe 1. As a primer, an alcoholic primer, RCN-33 (available from Forefront) was used.

Example 2

Polyamide resins having a mixing ratio of; NOVAMID 1030:NOVAMID ST145=3:7 were used for a casing pipe 1. As a primer, an alcoholic primer, RCN-33 (available from Forefront) was used.

Comparative Example 1

Polyamide resins having a mixing ratio of;

NOVAMID 1030:NOVAMID ST145=1:1 were used for a casing pipe 1. As a primer, an acetone type primer was used.

Comparative Example 2

Polyamide resins having a mixing ratio of; NOVAMID 1030:NOVAMID ST145=1:1 were used for a casing pipe 1. As a primer, other acetone type primer than that in Comparative Example 1 was used.

TABLE 1

| No. | Yield tensile strength (MPa) | State at the time of yield |
|---|---|---|
| | | Example 1 |
| 1 | 52.3 | Casing pipe is elongated. No drop, deformation and breakage of tip cap portion |
| 2 | 49.5 | Casing pipe is elongated. No drop, deformation and breakage of tip cap portion |
| 3 | 48.2 | Casing pipe is elongated. No drop, deformation and breakage of tip cap portion |
| | | Example 2 |
| 1 | 36.4 | Casing pipe is elongated. No drop, deformation and breakage of tip cap portion |
| 2 | 35.0 | Casing pipe is elongated. No drop, deformation and breakage of tip cap portion |
| 3 | 34.1 | Casing pipe is elongated. No drop, deformation and breakage of tip cap portion |
| | | Comparative Example 1 |
| 1 | 35.5 | Drop of tip cap portion |
| 2 | 30.5 | Drop of tip cap portion |
| 3 | 18.6 | Drop of tip cap portion |

TABLE 1-continued

| No. | Yield tensile strength (MPa) | State at the time of yield |
|---|---|---|
| | | Comparative Example 2 |
| 1 | 3.6 | Drop of tip cap portion |
| 2 | 0.9 | Drop of tip cap portion |
| 3 | 4.5 | Drop of tip cap portion |

As is apparent from the above-described Table 1, it is found that the protective pipe P which has been molded by using the alcoholic primer according to the present invention has a sufficient bonding strength compared with that applied with the acetone type primer. In regard to the protective pipe P in Examples 1 and 2, since a part of the casing pipe 1 was elongated to be broken at a yield point while no abnormality was noticed in the tip cap portion 2 after the test was performed, it is found that an integrated bonding strength thereof is larger than a yield tensile strength of the casing pipe 1. On the other hand, in cases in which the acetone type primer was used, the tip cap portion 2 was dropped in either case by a far small tensile strength before the casing pipe 1 was elongated due to a yield phenomenon; therefore, it can not be denied that a fear for an insufficient bonding strength is noticed. Further, it is found from results in Example 2 that the alcoholic primer sufficiently acts on the polymer alloy comprising the nylon 6 resin to allow it to be integrally bonded.

Next, after the protective pipes P which have been molded under conditions described in Examples 1 and 2, and Comparative Examples 1 and 2 were stored in a thermostatic oven set at 110° C. for 12 hours as a pretreatment, such protective pipes P were subjected to tensile tests in a thermostatic oven set at 100° C.; results are shown in Table 2 in an order of Examples 3 and 4, and Comparative Examples 3 and 4. Further, testing conditions are same as those in Examples 1 and 2, and Comparative Examples 1 and 2, except for a testing temperature.

TABLE 2

| No. | Yield tensile strength (MPa) | State at the time of yield |
|---|---|---|
| | | Example 3 |
| 1 | 23.6 | Casing pipe is elongated. No drop, deformation and breakage of tip cap portion |
| 2 | 22.5 | Casing pipe is elongated. No drop, deformation and breakage of tip cap portion |
| 3 | 23.6 | Casing pipe is elongated. No drop, deformation and breakage of tip cap portion |
| | | Example 4 |
| 1 | 19.5 | Casing pipe is elongated. No drop, deformation and breakage of tip cap portion |
| 2 | 18.2 | Casing pipe is elongated. No drop, deformation and breakage of tip cap portion |
| 3 | 19.0 | Casing pipe is elongated. No drop, deformation and breakage of tip cap portion |
| | | Comparative Example 3 |
| 1 | 19.1 | Drop of tip cap portion |
| 2 | 9.5 | Drop of tip cap portion |
| 3 | 21.8 | Drop of tip cap portion |

TABLE 2-continued

| No. | Yield tensile strength (MPa) | State at the time of yield |
|---|---|---|
| | | Comparative Example 4 |
| 1 | 2.3 | Drop of tip cap portion |
| 2 | 3.6 | Drop of tip cap portion |
| 3 | 2.3 | Drop of tip cap portion |

As is apparent from the above-described Table 2, each tensile strength under an environment of a high temperature at the time the casing pipe 1 was elongated due to a yield phenomenon and also at the time the tip cap portion 2 was dropped is approximately half of that at a normal temperature; on the other hand, it is found that an effect of the alcoholic primer which has been recognized in Examples 1 and 2 is also recognized on this occasion.

Figure 7:
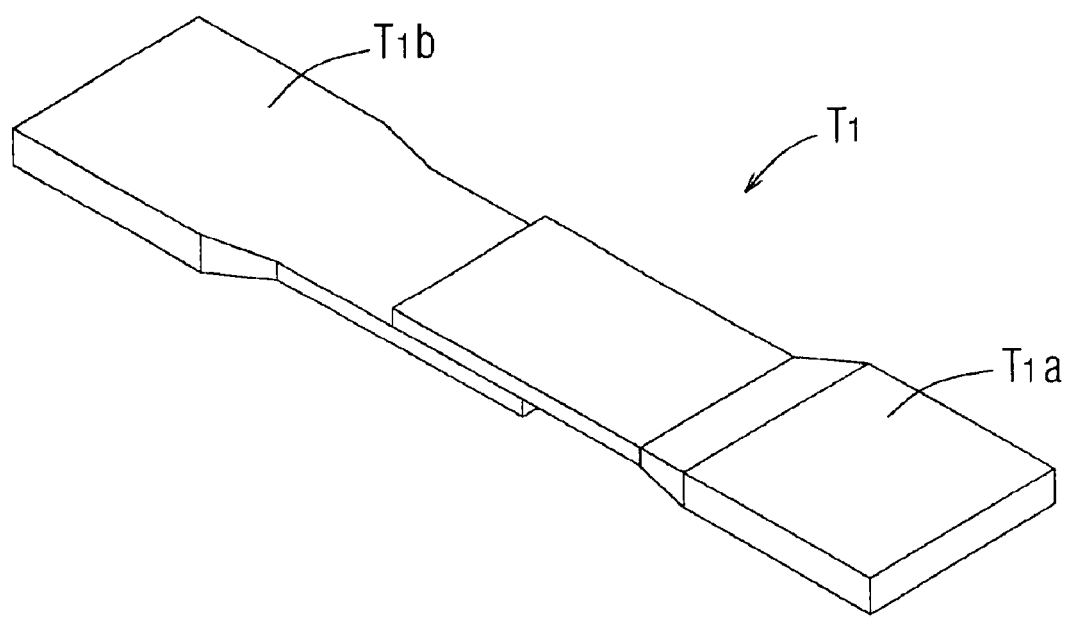
FIGS. 7A and 7B are a perspective view and a front elevational view of a test piece $T_1$, respectively.
Figure 7:
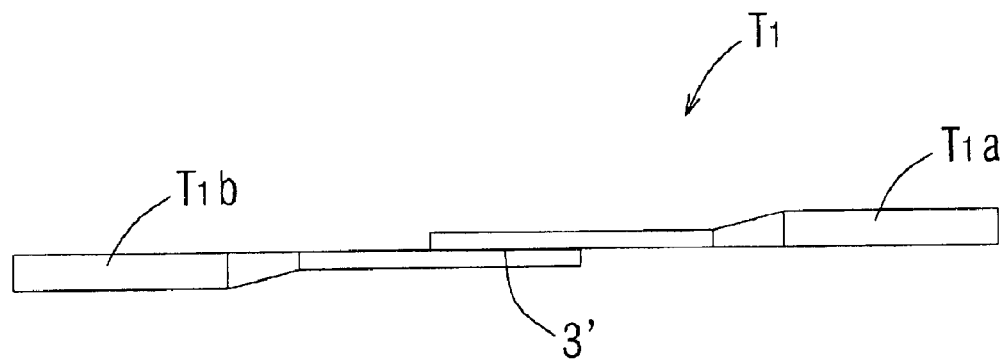

Further, a test piece $T_1$ having a shape as shown in FIG. 7 was molded by using a polyamide resin and then was subjected to a tensile test; on this occasion, each test piece $T_1$ molded under conditions described below was measured of tensile strength thereof at the time of yield. As the polyamide resin, NOVAMID 1013CH5 (both being available from Mitsubishi Engineering-Plastics Corporation) was used. Results of tensile strength in Example 5 and Comparative Examples 5 and 6 are shown in Table 3. Soon after a test piece $T_1$ was immersed in boiling water for one hour for the purpose of humidification, the thus-treated test piece $T_1$ as subjected to tensile test in an atmosphere of 50% relative humidity and normal temperature. Further, conditions of the tensile test itself were same as in Examples 1 and 2, and Comparative Examples 1 and 2.

Example 5

Firstly, an already-molded article part $T_1a$ which has a shape of one side of a half portion to be obtained, provided that a test piece $T_1$ is divided into halves in a longitudinal direction, was injection-molded in advance and, then, an alcoholic primer is applied on a predetermined integral molding part 3' of the already-molded article part $T_1a$ and, thereafter, an additional molding part $T_1b$ was injection-molded as a remaining part against the thus primer-applied part $T_1a$ to prepare a test piece $T_1$ of a final molded article which has integrally been bonded and, then, the thus-prepared test piece $T_1$ was subjected to a test. As the alcoholic primer, used was RCN-33 (available from Forefront). Thickness and width of a portion of the test piece $T_1$, comprising the already-molded article part $T_1a$ and the additional molding part $T_1b$, which undergoes tensile strength were 2.5 mm and 25 mm, respectively.

Comparative Example 5

A test piece $T_1$, having the above-described shape, of a final molded article which has been integrally injection-molded as an entire body was used.

Comparative Example 6

The other half of the above-described already-molded article part $T_1a$ was injection-molded in advance and, then, an addition molding part $T_1b$ was injection-molded as a remaining part against a predetermined integral molding part 3 of the already-molded article part $T_1a$ without applying a primer at all to prepare a test piece $T_1$ of a final molded article which has thus integrally bonded to each other and, then, the thus-prepared test piece $T_1$ was subjected to a test.

TABLE 3

|  | Yield tensile strength (MPa) |
| --- | --- |
| Example 5 | 27.3 |
| Comparative Example 5 | 24.7 |
| Comparative Example 6 | — |

In Comparative Example 6, after a test piece $T_1$ was injection-molded and then released from a metallic die, an already-molded article part $T_1a$ and an additional molding part $T_1b$ were separated from each other whereupon a test was unable to be conducted. As is apparent from the above-described Table 3, since yield tensile strength of the test piece $T_1$ in Example 5 was far larger than that of the test piece $T_1$ in Comparative Example 5, bonding strength of the test piece $T_1$ which has been integrated with the additional molding part by using the alcoholic primer was same with or slightly more than the tensile strength of the test piece $T_1$ which has been integrally molded as an entire body by injection molding whereupon an effect of the alcoholic primer was confirmed. Further, in the test piece $T_1$, shearing force acts on a bonded part of the already-molded article part $T_1a$ and the additional molding part $T_1b$.

Figure 8:
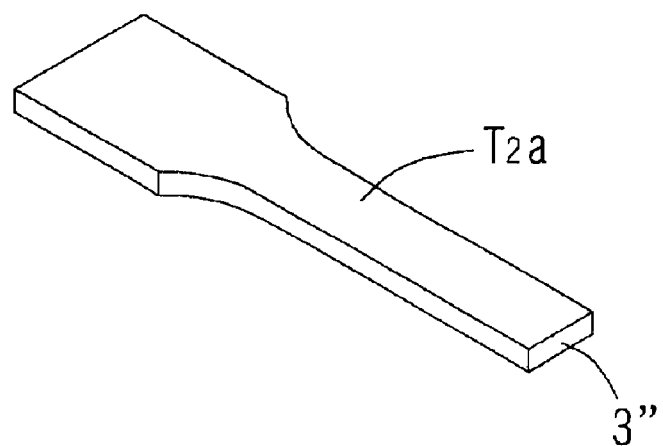
FIGS. 8A and 8B are an already-molded part $T_2$ which constitutes a test piece $T_{2a}$ and the test piece $T_{2b}$, respectively.
Figure 8:
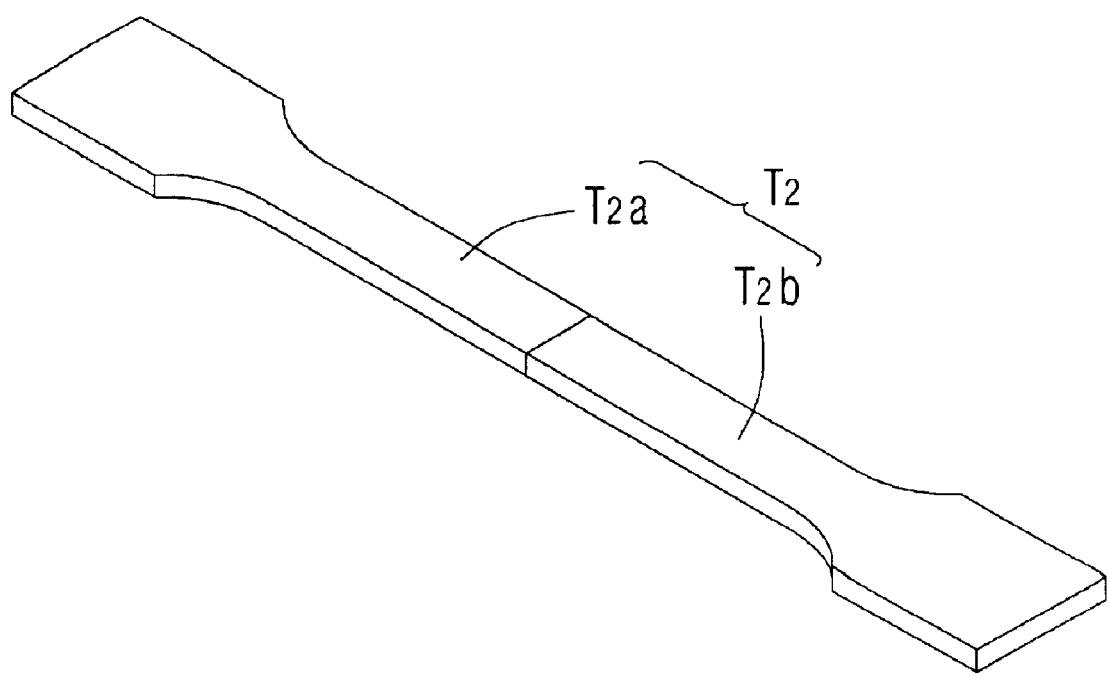

Further, a test piece $T_2$ having a shape as shown in FIG. 8 was molded by using a polyamide resin and, then, the thus-molded test piece $T_2$ was subjected to a test; on this occasion, tensile strength at the time of yield of each test piece $T_2$ which has been molded under conditions to be described below was measured. As the polyamide resin, NOVAMID 1013CH5 (available from Mitsubishi Engineering-Plastics Corporation) was used. Results of tensile strength of Examples 6 and 7, and Comparative Examples 7 and 8 are shown in Table 4. Further, soon after the test piece $T_2$ was left to stand in an atmosphere of 50% relative humidity at a normal temperature for 48 hours, a tensile test was conducted on the thus-treated test piece $T_2$. As a tensile tester, INSTRON 4505 (available from Instron Corporation) was used. On this occasion, a testing rate was 50.0 mm/min.

Example 6

Firstly, an already-molded article part $T_2a$ which has a shape of one side of a half portion to be obtained, provided that a test piece $T_2$ is divided into halves in a longitudinal direction, was injection-molded in advance and, then, an alcoholic primer is applied on an end surface 3″, which is narrower than the other one in a longitudinal direction, of a predetermined integral molding part of the already-molded article part $T_2a$ and, thereafter, an additional molding part $T_2b$ was injection-molded as a remaining part against the thus primer-applied part $T_2a$ to obtain a test piece $T_2$ of a final molded article which has thus integrally been bonded to each other. As the alcoholic primer, used was RCN-33 (available from Forefront). Thickness and width of a portion of the test piece $T_2$ which undergoes tensile strength were 3 mm and 10 mm, respectively.

Example 7

A tensile test was conducted under same test conditions as in Example 6 except for that the test was conducted in a thermostatic oven held at 100° C.

Comparative Example 7

A tensile test was conducted under a normal temperature by using a test piece $T_2$, which has the above-described shape, of a final molded article which has been integrally injection-molded as an entire body.

Comparative Example 8

A tensile test was conducted in a thermostatic oven held at 100° C. by using a test piece $T_2$, which has the above-described shape, of a final molded article which has been integrally injection-molded as an entire body.

TABLE 4

|  | Yield tensile strength (MPa) | | | | |
| --- | --- | --- | --- | --- | --- |
|  | 1 | 2 | 3 | 4 | 5 |
| Example 6 | 66.6 | 71.4 | 69.2 | 70.5 | 70.8 |
| Example 7 | 28.3 | 25.8 | 21.9 | 29.3 | 29.0 |
| Comparative Example 7 | 60.7 | 62.4 | 61.6 | 61.5 | 61.0 |
| Comparative Example 8 | 24.7 | 25.0 | 24.7 | 24.9 | 24.9 |

Table 4 shows results of tensile tests conducted on 5 pieces of test pieces $T_2$ in each of Examples 6 and 7, and Comparative Examples 7 and 8; although tensile strength at a temperature of 100° C. was half of that at a normal temperature, bonding strength of the test piece $T_2$ integrally molded with the additional molding part by using the alcoholic primer was same with or slightly larger than the tensile strength of the test piece $T_2$ which has integrally been injection-molded as an entire body whereupon an effect of the alcoholic primer was confirmed also in this test piece $T_2$. Further, in the test piece $T_2$, tensile strength acts on a bonded part of the already-molded article part $T_2a$ and the additional molding part $T_2b$.

The above-described protective pipe P is an example of the injection molded article of the polyamide resin according to the present invention; on this occasion, so long as it is a molded article in which an additional molding part comprising a same resin as that of an already-molded part is integrally injection-molded against the already-molded part comprising a polyamide resin, any type of molded articles can be an object of the molding method according to the present invention. Further, the polyamide resin is not limited to that in which a side chain of an amide group is linear.

According to the present invention, when an additional molding part comprising a same resin as that of an already-molded article is injection-molded against the already-molded article comprising a polyamide resin, the already-molded article and the additional molding part concerned with such injection molding can be integrated while having a sufficient bonding strength only by using a primer comprising an alcohol solution containing a polyamide resin and a chemical which can dissolve the polyamide resin.

What is claimed is:

1. An injection molding method of a polyamide resin molded article in which an already-molded article comprising a polyamide resin is set in a molding die and, then, the polyamide resin that has been heated to be in a molten state is injection-filled in a cavity to which a part of said already-molded article faces thereby integrally molding an additional molding part onto the part of said already-molded article, wherein a primer comprising an alcohol solution containing the polyamide resin and phenoles that are capable of dissolving the polyamide resin is applied to a predetermined integral molding part of said already-molded article with the additional molding part and, then, the thus primer-applied already-molded article is set in the molding die.

2. The injection molding method of a polyamide resin molded article as set forth in claim 1, wherein said primer is a solution comprising 1,3-dihydroxybenzene of from 20% by weight to 25% by weight, the polyamide resin of from 10% by weight to 20% by weight and methanol of from 60% by weight to 70% by weight.

3. The injection molding method of a polyamide resin molded article as set forth in claim 1, wherein said polyamide resin is an aliphatic nylon resin.

4. The injection molding method of a polyamide resin molded article as set forth in claim 1, wherein said already-molded article is a molded article in a shape of an elongated pipe; and wherein said additional molding part is addition-molded such that it covers an end part, in a longitudinal direction, of said already-molded article.

5. The injection molding method of a polyamide resin molded article as set forth in claim 2, wherein said polyamide resin is an aliphatic nylon resin.

6. The injection molding method of a polyamide resin molded article as set forth in claim 2, wherein said already-molded article is a molded article in a shape of an elongated pipe; and wherein said additional molding part is addition-molded such that it covers an end part, in a longitudinal direction, of said already-molded article.

7. The injection molding method of a polyamide resin molded article as set forth in claim 3, wherein said already-molded article is a molded article in a shape of an elongated pipe; and wherein said additional molding part is addition-molded such that it covers an end part, in a longitudinal direction, of said already-molded article.

8. A method of making an article formed of polyamide resin, said method comprising:

applying a primer to a selected portion of an already-molded structure formed of a polyamide resin, wherein the primer comprises an alcohol solution containing polyamide resin and phenoles that are capable of dissolving the polyamide resin;

placing the already-molded structure in a molding die such that the selected portion of the already-molded structure is exposed in a cavity of the molding die;

heating a polyamide resin to a molten state; and injecting the molten polyamide resin into the cavity of the molding die thereby integrally molding an additional part onto the selected portion of said already-molded structure.

* * * * *